Jan. 4, 1949.　　　G. S. POWERS　　　2,458,299
CANE HARVESTING MACHINE
Filed April 12, 1946　　　5 Sheets-Sheet 1

Inventor,
George S. Powers.
By Mason & Hatfield
attys.

Jan. 4, 1949.  G. S. POWERS  2,458,299
CANE HARVESTING MACHINE
Filed April 12, 1946  5 Sheets-Sheet 2
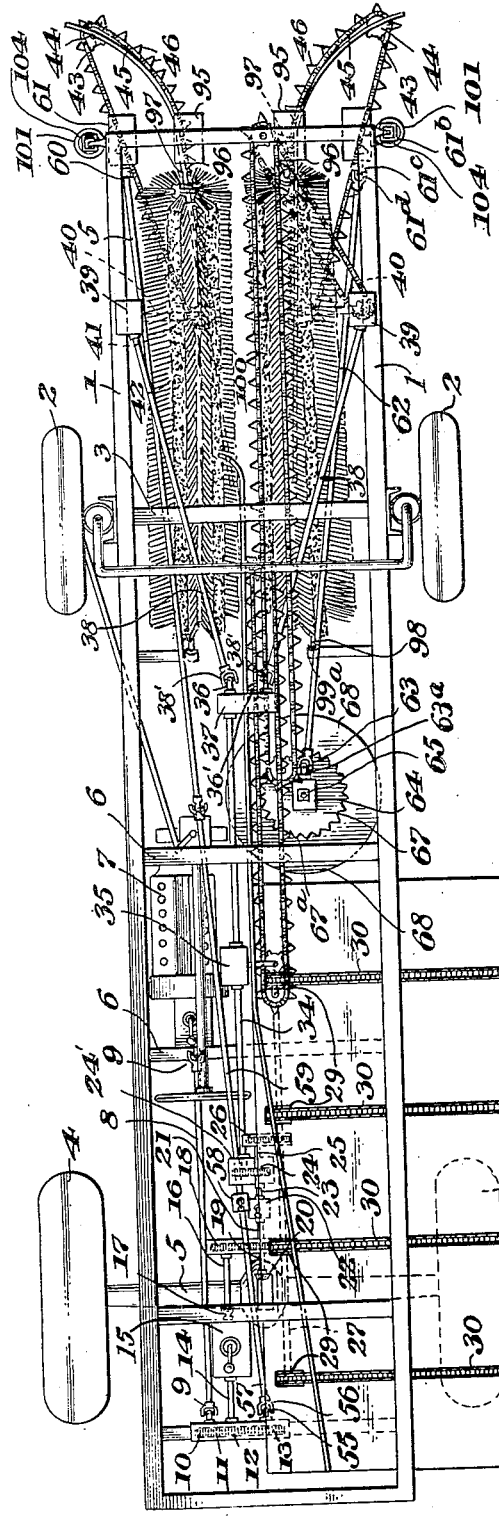
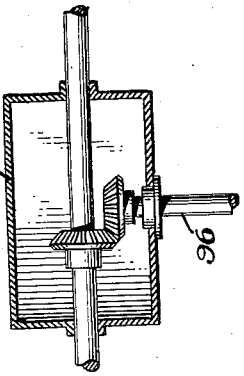
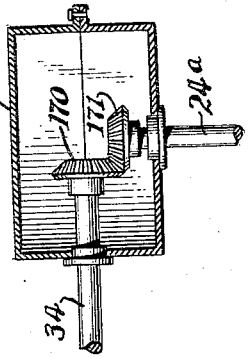
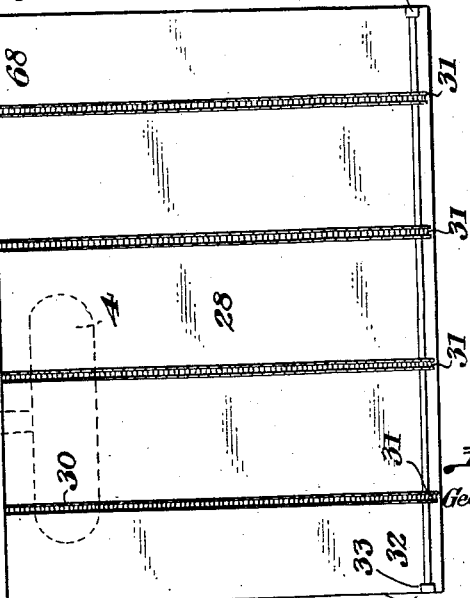
Inventor:
George S. Powers,
By Mason & Hatfield Attys.

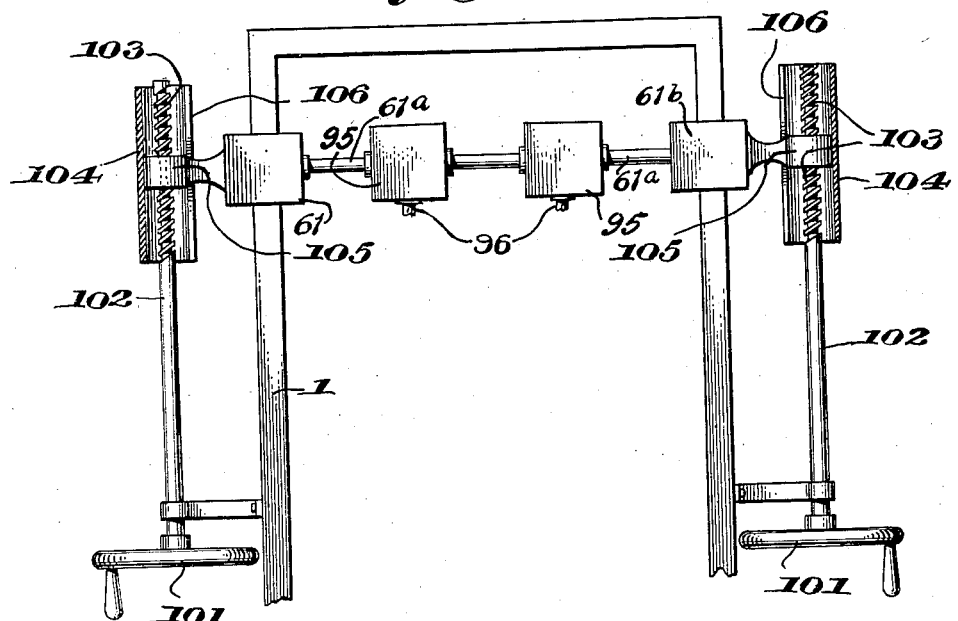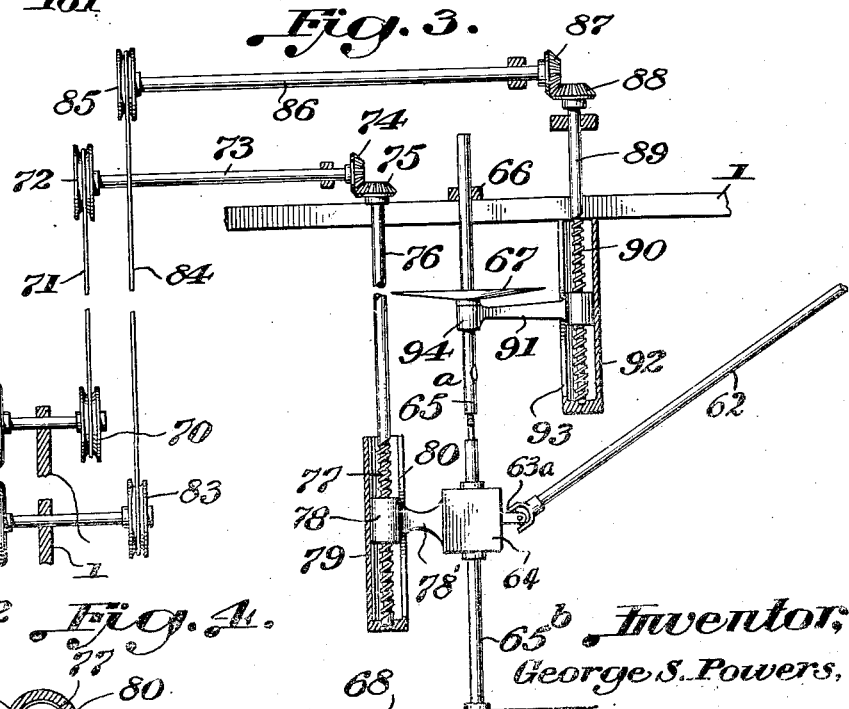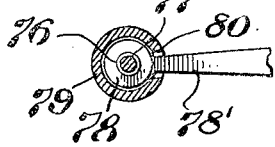

Jan. 4, 1949.　　　　G. S. POWERS　　　　2,458,299
CANE HARVESTING MACHINE

Filed April 12, 1946　　　　　　　　　　5 Sheets-Sheet 4

Inventor.
George S. Powers,

By Mason & Hatfield Attys.

Jan. 4, 1949.    G. S. POWERS    2,458,299
CANE HARVESTING MACHINE
Filed April 12, 1946    5 Sheets-Sheet 5
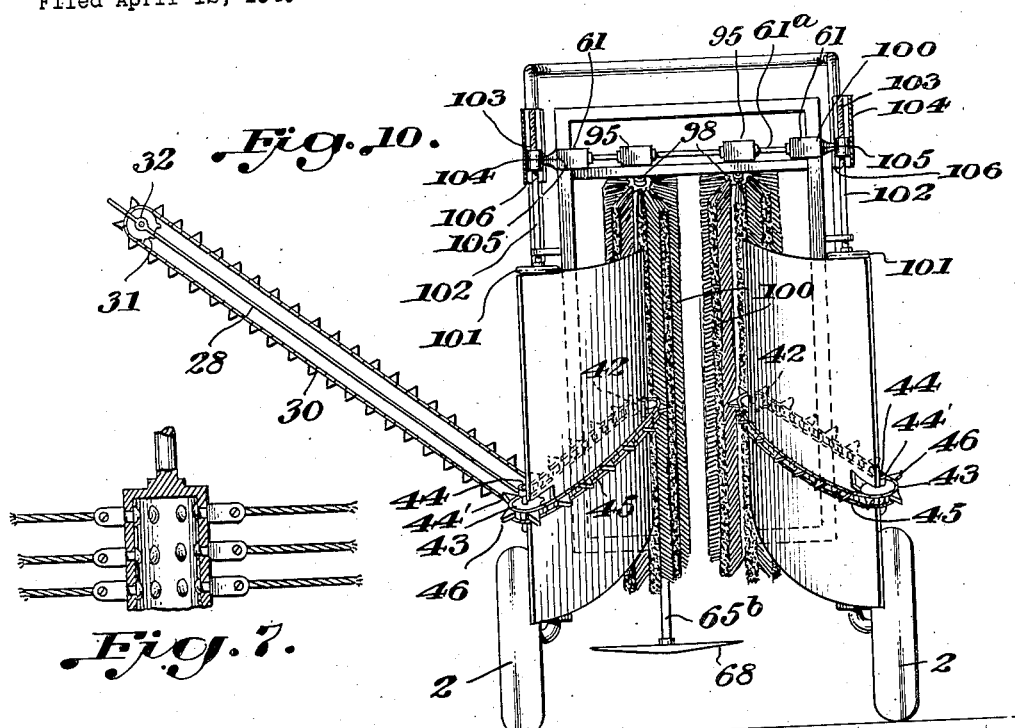
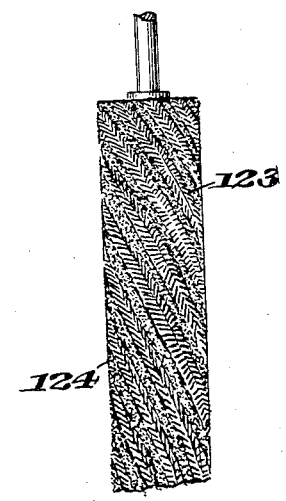
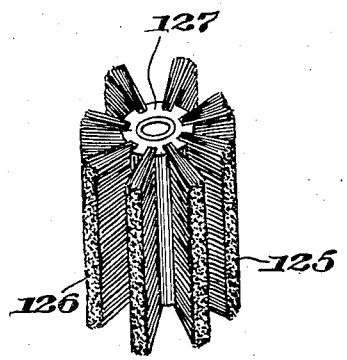
Inventor,
George S. Powers,
By Mason & Hatfield
Attys.

Patented Jan. 4, 1949

2,458,299

UNITED STATES PATENT OFFICE 2,458,299

CANE HARVESTING MACHINE

George S. Powers, New Roads, La.

Application April 12, 1946, Serial No. 661,846

10 Claims. (Cl. 56—17)

This invention relates to a machine for cutting the stalks and stripping leaves from the stalks of standing crops such as sugar cane, corn, etc., but especially sugar cane.

An object of the invention is to provide a machine for guiding and holding in upright position a plurality of stalks of a row of standing stalks while progressively stripping the leaves from the stalks beginning at the tops and ending at the bottom of the stalks.

Another object of the invention is to sever the tops of the stalks and cut off the stalks near the ground at about the time the stripping operation is completed.

An additional object is to provide readily adjustable means operable while the machine is in motion by the driver for independently adjusting the several cutters into different horizontal planes to thereby obtain maximum yield of the sugar cane or other crops being harvested.

A further object is to provide readily adjustable means operable from the driver's seat for adjusting the angles of the stripper brushes.

Another important object of the invention is to provide in a cane harvesting machine a conveyor carrier for the cut stalks which may be moved to an upright position when the machine is moving from one field to another, and when not engaged in harvesting cane.

Still a further object is to provide a cane harvesting machine provided with a plurality of stripper brushes, and brush cleaners therefor, adjustable from the driver's seat while the machine is harvesting cane.

An additional object is to provide a unitary self propelled cane harvesting machine having a single source of power for propelling the machine and driving the harvesting mechanisms including the several guiding conveyors, leaf strippers, cane cutters, and the conveyor carrier for the cut stalks.

Another object is to provide feeding means for feeding the cane past the cutters, which feeding means supports the cane on its opposite sides at vertically spaced positions.

Other objects will appear hereinafter throughout the specification.

In the drawings:

Figure 2 is a top plane view of the machine shown in Figure 1 with the conveyor carrier in unfolded or operating position.

Figure 3 is an enlarged detail view of the adjusting mechanism for the cutters.

Figure 4 is a detail view of the adjustable screw and nut of the adjusting mechanism.

Figure 5 is an enlarged detail view of the brush adjusting mechanism.

Figures 7, 8 and 9 disclose different types of stripper brushes.

Figure 10 is a detail view of the brush cleaner mechanism.

Figure 11 is a detail view of the gear box containing bevel gears.

Figure 12 is a detailed view of the gear box containing the shaft which extends transversely across the machine and the connecting shaft with beveled gears for drivingly connecting these shafts.

The invention embodies a cane harvesting machine preferably of the self propelled type, which straddles the cane row. The machine proceeds down the cane row and cleans, cuts and loads the cane by removing the leaves or flags, topping and cutting the cane and finally loading the cut cane in a continuous operation. The structure provides means for uniformly feeding the cane to the several instrumentalities for effecting the foregoing steps.

Figure 1:
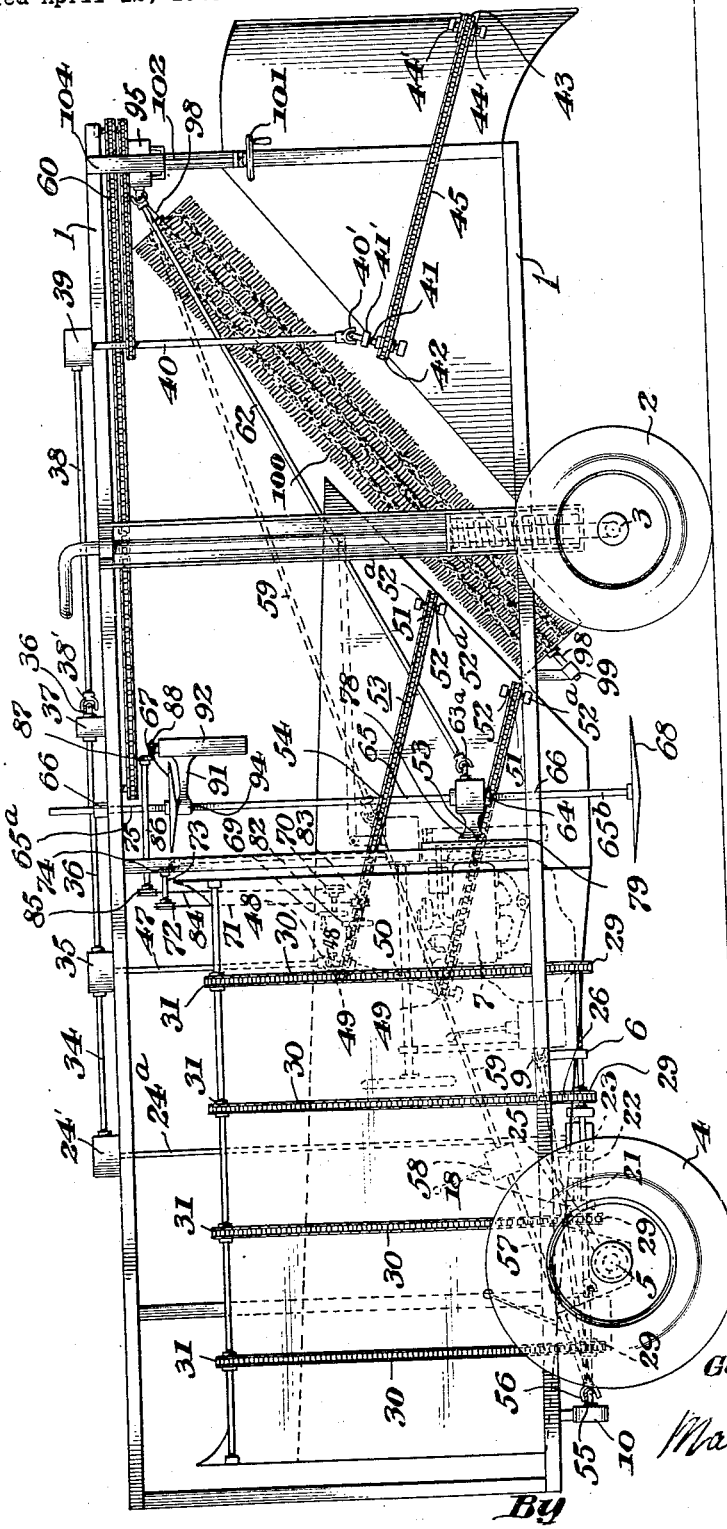
Figure 1 is a side elevation of the machine with the conveyor carrier in folded position.
Figure 6:
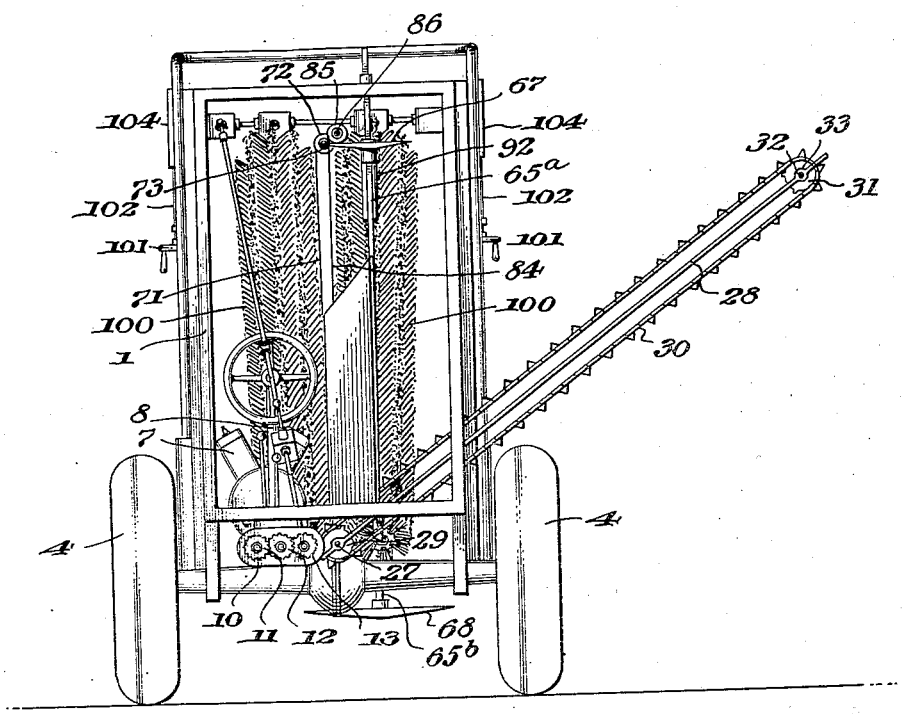
Figure 6 is an enlarged detail view of the conveyor carrier.

Referring to the drawings, the numeral 1 indicates generally the frame of the cane harvester extending forwardly of the engine as shown in Figure 1, provided with front wheels 2 mounted on an axle 3, and rear driving wheels 4 mounted on axle 5.

Suitably supported in cross frame supports 6 is a source of power 7, such as an internal combustion engine.

The engine drive shaft 8 extends rearwardly and is provided with universal joints 9. The shaft extends into a gear box 10 provided with the meshed gears 11, 12 and 13, the drive shaft being fixed to gear 11.

As more particularly shown in Figure 2, the intermediate gear 12 is drivingly connected to shaft 14, change gear transmission 15, driven shaft 16 and interposed universal joint 17. Shaft 16 is fixed to one of a pair of gears in spur gear box 18. The other gear in said spur gear box is connected to shaft 19 which drives differential 20 of the rear axle 5.

Connected also to said other gear and on the opposite side from shaft 19, is shaft 21 which extends into a suitable clutch shown at 22. On the opposite side of clutch 22 from shaft 21 is shaft 23 which extends into gear box 24 having two meshed gears 301 and 302.

One of these gears is directly connected to shaft 23, and on its opposite side is connected shaft 25. In actual practice, shafts 19, 21, 23 and 25 may be two shafts with the several gears (one in each gear box) aforementioned mounted upon them, and adapted to be drivingly connected by clutch 22.

Shaft 25 connects into gear box 26 containing a pair of meshed gears, one gear of the pair being mounted on said shaft. The other gear is mounted upon the conveyor carrier drive shaft 27, mounted in suitable bearings (not shown).

The conveyor carrier is indicated generally at 28. This device is pivoted on the shaft 27 and may be swung upwardly from its operative position shown in Figure 2 to its folded position shown in Figure 1, when the machine is moved from one field to another.

The conveyor carrier drive shaft 27 has fixedly mounted on it a plurality of spaced sprocket wheels 29. Chains 30 are trained over these sprocket wheels and sprocket wheels 31 freely rotatable on shaft 32 mounted in bearings 33 of the conveyor carrier.

Referring again to gear box 24 (Figures 1 and 12) the shaft 24a extends from this gear box to gear box 24' and as indicated in Figure 11, the gear box 24' and the shaft 34 are each provided with beveled gears whereby shaft 34 is driven by shaft 24a. The gear box 24' has gears 170 and 171 as shown in Figure 12.

The shaft 38 is connected by a universal joint 38' to shaft 36 having an extension on the right side of the gear box as shown in Figure 2. The other gear has a stub shaft 36' connected to a second universal joint 38' and a second shaft 38.

Each shaft 38 is connected into the gear box 39 (similar to that shown in Figure 11). The shaft 40 extends downwardly to universal joint 40' and connects by means of such joint to shaft 41 mounted in bearings 41', and having sprocket wheel 42 fixed to said shaft 41.

Each wheel 42 drives its chain 45 having a freely turning sprocket wheel 43 mounted on fixed axle 44 in bearings 44'. Sprocket wheels 42 and 43 and their shafts are suitably mounted in the framework of the machine, and the chains 45 which are driven by sprocket wheels 42, are each provided with lugs 46. These lugs serve to guide the cane toward the cutters of the machine, which cutters are presently to be described.

It will be noted by referring to Figure 2 that each guide chain 45 and its drive means extends longitudinally of the machine and slightly to the right and to the left of the longitudinal center line of the machine.

The cutter feed chains to be now described are preferably four in number, each pair being separated vertically but slightly inclined (Figure 1), and each pair being located on opposite sides of the longitudinal center of the machine.

Extending downwardly from gear box 35 is shaft 47 connected at its lower end to shaft 50 by universal joint 48. Mounted near the ends of shaft 50 are splined the sprocket wheels 49. The numeral 51 indicates sprocket wheels mounted on shafts 52 and supported on bearings 52a on the framework 1. Two sprocket chains 53 are shown in Figure 1, each provided with lugs 54 serving to guide the cane into past the cutters.

The gear box 10 is provided with a stub shaft 55. A universal joint 56 connects this shaft to a shaft 57, whose other end is connected to a clutch 58. Extending forwardly from the clutch is a shaft 59 whose other end is connected by universal joint 60 to a gear box 61 and drives through said gear box the shaft 61a (Figures 5 and 10). The opposite end of shaft 61a is connected to a second gear box 61b.

One of the bevel gears in gear box 61b is connected to a short shaft 61c which by means of the universal joint 61d drives telescopic shaft 62.

The other end of shaft 62 by means of universal joint 63 drives the stub shaft 63a (Figure 2) which extends in gear box 64 thereby driving the cutter shaft 65. This shaft is mounted in bearings 66 and is composed of two telescoping sections 65a and 65b. One section has a squared socket into which a squared extension telescopes. Section 65a mounts the upper rotary knife 67 and section 65b mounts the bottom rotary knife 68. Upper knife has a serrated edge 67a while the lower knife has a circular smooth edge 68a, as shown in Figure 2.

The knives may be adjusted in a vertical direction by the mechanism shown in Figure 3. The lower knife 68 may be vertically adjusted by rotation in either direction of the handle 69 which rotates pulley 70 suitably journaled in framework 1. Rotation of the pulley 70 rotates by means of belt 71 the pulley 72 fastened on shaft 73.

Shaft 73 rotates gears 74 and 75 thereby rotating shaft 76 whose lower end is screw threaded at 77. The threads engage threaded nut 78 which is guided in guide 79, the guide having a slot 80 through which the nut extends. The nut 78 has an extension 78' attached to housing 64.

The upper knife may be similarly adjusted by means of handle 82, pulley 83, belt 84, pulley 85, shaft 86, gears 87 and 88, shaft 89 having threads 90, threaded nut 91, guide 92 provided with slot 93 and extension 94 attached to upper shaft section 65a.

Shaft 61a, which is one of the shafts that drives the upper and lower knives as explained above, also drives the rotary cleaning or leaf removing brushes. Located on said shaft, and on either side of a line passing through the longitudinal center of the machine, are gear boxes 95 (Fig. 2), the interiors of which are as shown in Figure 12.

Extending from each gear box is a short shaft 96 which connects by means of a universal joint 97 to the brush shaft 98 whose other end is mounted in a bearing 99 suitably mounted on the framework of the machine, and the shaft 98 may slide in the bearings 99 which loosely surround the shafts as the brushes are adjusted.

The brushes 100 are rotatably supported on the shafts as shown in Figures 1 and 2.

The brushes 100 may assume any of the forms shown in Figures 7, 8 or 9.

In Figure 7 the brush 120 is provided with a plurality of clamps 121, each of which has a cable or a metal rod, shown at 122.

Figure 8 shows a brush 123, the bristles 125 of which form a solid cylinder, the said bristles being spirally arranged.

In Figure 9 the brush 125 has a plurality of rows of bristles affixed to metal trough portions 127.

Adjustment of the brushes may be effected by the structures shown in Figure 5 wherein 101 indicates handwheels, 102 shafts having threads 103, guides 104, 105 threaded nuts sliding in slots 106 of guides 104.

Referring to Figure 10 it will be noted that the placement of the brushes is such that their elevated ends, which are nearest to the front of the machine, are connected to inter-gear boxes 95. These shafts can be composed of telescoping sections (not shown) splined to each other so that as the hand wheels 101 are rotated the gear boxes 95 may be moved up or down in a vertical direction, thus raising or lowering the upper ends of the brushes.

*Operation*

The source of power or engine 7 having been started the machine is caused to travel down a row of standing cane upon manipulation of the transmission 15. By means of the clutches, heretofore described, the belts 45, 53 and 30, each provided with cane engaging lugs, and the rotary brushes are all being driven.

The cane stalks are each guided into the center of the machine by belts 45. As a portion of these belts overlap, as viewed in Figure 2, the brushes 100, the cane is still being guided by said belts as the brushes begin to progressively strip the flags from the cane beginning near the top and progressively removing the flags in a downward direction due to the inclination of the brushes. The overlapping of the belts 45 and brushes 100 and their inclination to each other is an important feature of this invention, as the proper guiding and supporting of the cane is thus assured, and the cane is guided so as to be tangent to the circumferential surfaces of the brushes.

As soon as the cane has been stripped of its flags, it is engaged by the belts 54 and guided toward the knives. It is an important feature that the cane be first cut by the bottom knife, whose diameter is greater than the upper knife, thus insuring this action. Immediately it is cut from the ground by the bottom knife, it is cut or "topped" by the upper knife, after which it is fed in a vertical position until it clears the upper belts 53, whereupon its top portion falls to the right as viewed in Figure 2.

The cane assumes almost a horizontal position before being released by the lower runs of the belts. This is a further important feature of the invention.

When the cane has assumed almost a horizontal position it falls on the conveyor carrier 28 where it is conveyed to a wagon or other conveyance which is traveling along a parallel path with the cane harvester.

I desire to be limited only to the extent set forth in the appended claims.

I claim:

1. A cane harvesting machine including a vehicle body having a forwardly extending frame, a plurality of rotary leaf removing brushes operatively mounted on said frame, driving means operatively connected to said brushes, said brushes being inclined to the longitudinal horizontal axis of said machine, said brushes having their elevated ends mounted forwardly and their depressed ends located rearwardly in the frame, whereby said brushes will remove from the standing stalks the uppermost leaves and progressively remove the lower leaves from the standing stalks of cane.

2. A cane harvesting machine including a vehicle body having a forwardly extending frame, including a pair of guide means for guiding the standing stalks at the advancing end of the machine, a plurality of rotary leaf removing brushes operatively mounted on said frame, driving means operatively connected to said brushes, said brushes being inclined to the longitudinal horizontal axis of said machine, said brushes having their elevated ends mounted forwardly and their depressed ends located rearwardly in the frame, whereby said brushes will remove from the standing stalks the uppermost leaves and progressively remove the lower leaves from the standing stalks of cane.

3. The structure set forth in claim 1 provided with spaced apart guide means extending forwardly and rearwardly from said brushes.

4. The structure set forth in claim 1 provided with rotary stalk cutting means located beneath said rearwardly extending guide means and to the rear of said brushes.

5. The structure set forth in claim 1 provided with means for adjusting said brushes in vertical planes.

6. The structure set forth in claim 1 provided with means for adjusting said cutting means in a vertical plane.

7. The structure set forth in claim 1 provided with means for adjusting said brushes in a vertical direction, cutting means located rearwardly of said brushes.

8. The structure set forth in claim 1 provided with means for adjusting said cutting means in a vertical direction.

9. The structure set forth in claim 1 provided with at least one of said guide means extending at an angle to said brushes.

10. The structure set forth in claim 1 provided with said rearwardly extending guide means including pairs of chain runs one pair being located above the other pair.

GEORGE S. POWERS.

REFERENCES CITED

The following references are of record in the file of this patent:

UNITED STATES PATENTS

| Number | Name | Date |
| --- | --- | --- |
| 820,730 | Pessou | May 15, 1906 |
| 857,451 | Ehrlich et al. | June 18, 1907 |
| 1,122,741 | Hadley | Dec. 29, 1914 |
| 1,365,213 | Woodland | Jan. 11, 1921 |
| 1,630,097 | Scranton | May 24, 1927 |
| 2,281,904 | Wurtele | May 5, 1942 |
| 2,346,963 | Hague | Apr. 18, 1944 |